(12) United States Patent
Tinnin

(10) Patent No.: US 9,428,213 B2
(45) Date of Patent: Aug. 30, 2016

(54) ENERGY ABSORBING DEVICE FOR A STEERING COLUMN

(71) Applicant: Steering Solutions IP Holding Corporation, Saginaw, MI (US)

(72) Inventor: Melvin L. Tinnin, Clio, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/748,635

(22) Filed: Jun. 24, 2015

(65) Prior Publication Data

US 2015/0375773 A1 Dec. 31, 2015

Related U.S. Application Data

(60) Provisional application No. 62/018,265, filed on Jun. 27, 2014.

(51) Int. Cl.
*B62D 1/00* (2006.01)
*B62D 1/19* (2006.01)
*F16F 7/12* (2006.01)

(52) U.S. Cl.
CPC ............... *B62D 1/195* (2013.01); *F16F 7/128* (2013.01)

(58) Field of Classification Search
CPC .......... B62D 1/11; B62D 1/16; B62D 1/163; B62D 1/185; B62D 1/19; B62D 1/192
USPC .................................... 280/777; 74/492, 493
See application file for complete search history.

(56) References Cited

U.S. PATENT DOCUMENTS

| | | | | |
|---|---|---|---|---|
| 5,520,416 A | * | 5/1996 | Singer, III ............. | B62D 1/181 280/775 |
| 5,706,704 A | * | 1/1998 | Riefe ...................... | F16F 7/125 188/371 |
| 7,325,834 B2 | * | 2/2008 | Manwaring ............ | B62D 1/195 280/777 |
| 2003/0102658 A1 | * | 6/2003 | McCarthy .............. | B62D 1/195 280/777 |
| 2004/0217581 A1 | * | 11/2004 | Dubay ................... | B62D 1/195 280/777 |
| 2006/0049621 A1 | * | 3/2006 | Lee ........................ | B62D 1/195 280/777 |
| 2007/0194563 A1 | * | 8/2007 | Menjak .................. | B62D 1/195 280/777 |
| 2007/0228716 A1 | * | 10/2007 | Menjak .................. | B62D 1/192 280/777 |
| 2008/0111363 A1 | * | 5/2008 | Menjak .................. | F16F 7/123 280/777 |

* cited by examiner

*Primary Examiner* — Toan To
(74) *Attorney, Agent, or Firm* — Cantor Colburn LLP

(57) ABSTRACT

An energy absorbing device for a steering column assembly is provided. The device includes a first strap coupled to the steering column assembly, the first strap configured to absorb energy of an impact event on the steering column assembly, a second strap coupled to the steering column assembly. The second strap is also configured to absorb energy of an impact event on the steering column. A coupling device connects the second strap to the first strap such that both the first strap and the second strap absorb energy of a first impact event. The coupling device selectively uncouples the second strap from the first strap such that the only the first strap absorbs energy of a second impact event.

7 Claims, 4 Drawing Sheets

ENERGY ABSORBING DEVICE FOR A STEERING COLUMN

CROSS-REFERENCES TO RELATED APPLICATIONS

This patent application claims priority to U.S. Provisional Patent Application Ser. No. 62/018,265, filed Jun. 27, 2014, which is incorporated herein by reference in its entirety.

FIELD OF THE INVENTION

The following description relates to energy absorbing devices, and in particular, to an energy absorbing device for a steering column.

BACKGROUND

Roll strap devices have been used as a means to absorb energy during the collapse of a steering column. Typically, roll straps absorb energy during the deformation of the strap in crash event. For example, a vehicle operator may contact the steering column assembly, whereby kinetic energy of the occupants may be dissipated through compression of the steering column assembly. However, it may be advantageous to adjust the collapse characteristics of roll strap devices based upon an anticipated impact event.

Accordingly, it is desirable to provide systems and methods for varying the collapse load of the steering column to provide a desired kinetic energy dissipation in the event of contact between an object and a steering column assembly.

SUMMARY OF THE INVENTION

In one exemplary embodiment of the present invention, an energy absorbing device for a steering column assembly is provided. The device includes a first strap coupled to the steering column assembly, the first strap configured to absorb energy of an impact event on the steering column assembly, a second strap coupled to the steering column assembly, the second strap configured to absorb energy of an impact event on the steering column, and a device coupling the second strap to the first strap such that both the first strap and the second strap absorb energy of a first impact event. The device selectively uncouples the second strap from the first strap such that the second strap does not absorb energy of a second impact event.

In another exemplary embodiment of the present invention, a steering column assembly is provided. The steering column assembly includes a mounting bracket, a first jacket coupled to the mounting bracket and having a first longitudinal axis, and a second jacket slidably disposed with the first jacket for telescoping movement along the longitudinal axis relative to the first jacket. The assembly further includes an energy absorbing device operatively associated with the second jacket. The energy absorbing device includes a first strap coupled to the second jacket, the first strap configured to absorb energy of an impact event on the steering column assembly, a second strap coupled to the second jacket, the second strap configured to absorb energy of an impact event on the steering column, and a device coupling the second strap to the first strap such that both the first strap and the second strap absorb energy of a first impact event. The device selectively uncouples the second strap from the first strap such that the second strap does not absorb energy of a second impact event.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
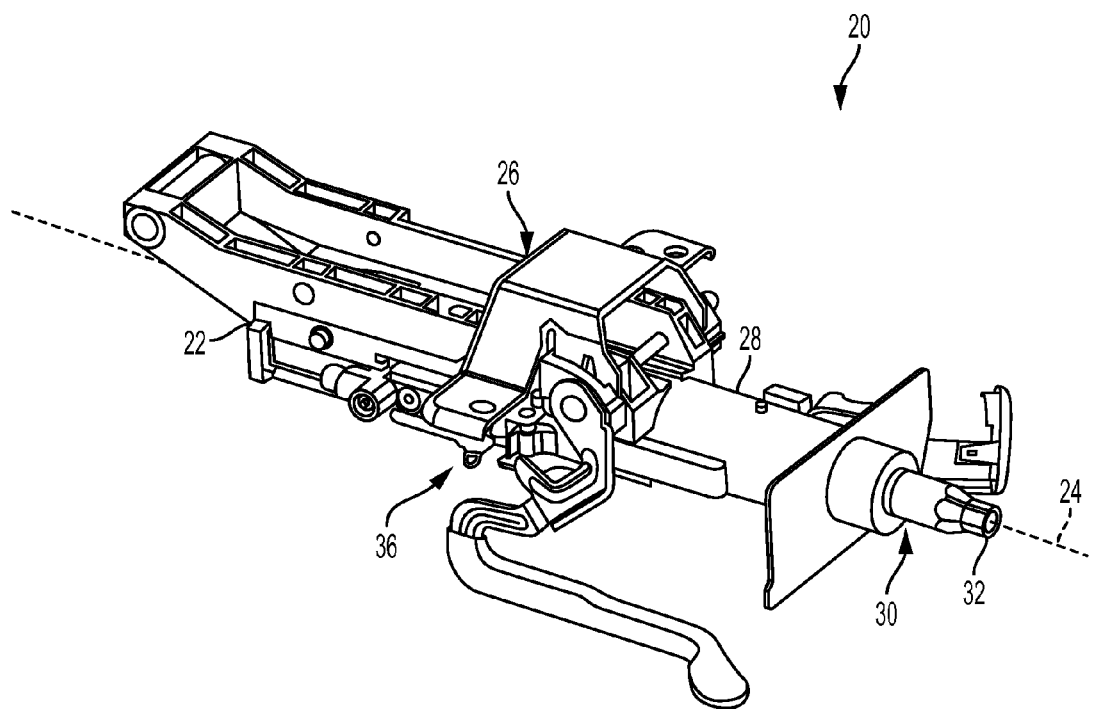
FIG. 1 is a perspective view of a steering system according to an exemplary embodiment of the present invention.

Referring now to the Figures, where the invention will be described with reference to specific embodiments, without limiting same, FIG. 1 shows an exemplary steering column assembly 20 that includes a lower jacket 22 disposed along a longitudinal axis 24 and pivotally coupled to a mounting bracket 26, which is coupled to a host structure of a vehicle (not shown). An upper jacket 28 is arranged co-axially with lower jacket 22 and longitudinal axis 24 and is configured to translate along axis 24 relative to lower jacket 22, thereby facilitating telescoping and/or collapse motion of steering column assembly 20. A rotating inner shaft 30 is disposed co-axially within jackets 22, 28 and includes a steering wheel end 32 configured to receive a vehicle steering wheel (not shown).

Figure 2:
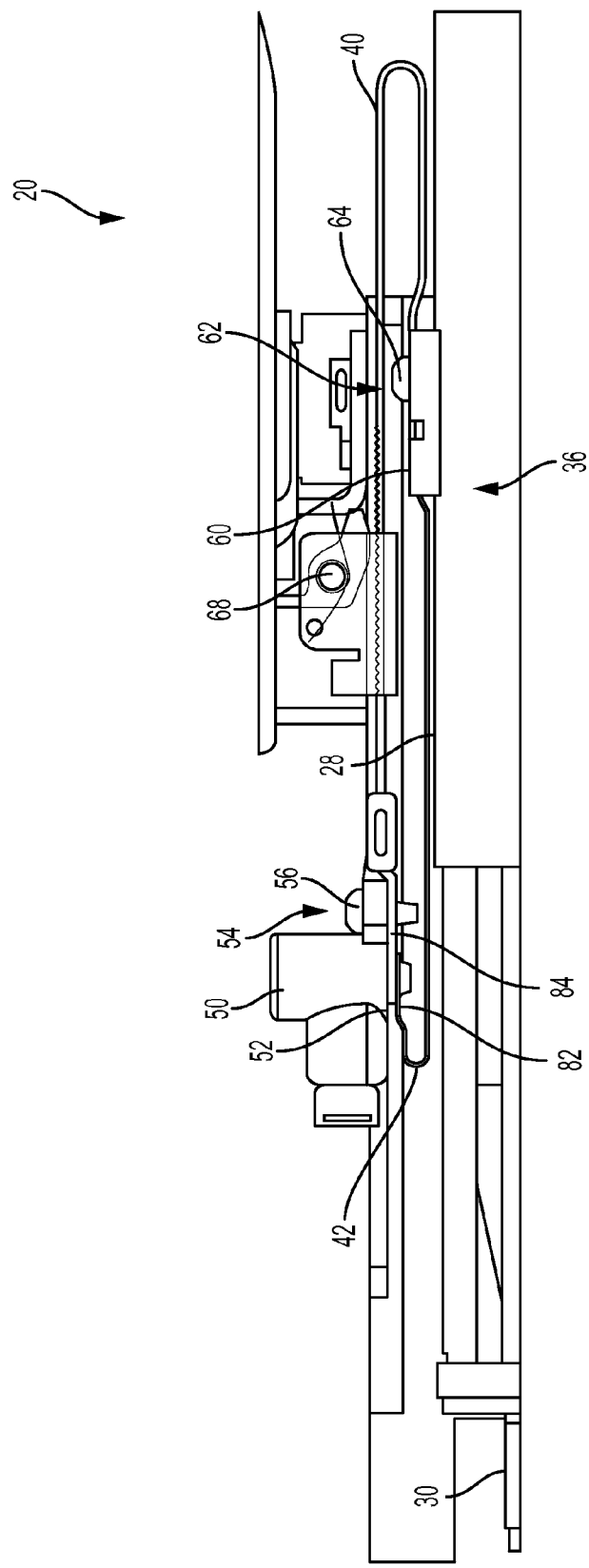
FIG. 2 is a bottom view of a portion of the steering system shown in FIG. 1.

With further reference to FIG. 2, steering column assembly 20 is in a nominal or normal position before a collapse or crash event. As shown, assembly 20 includes an energy absorbing device which comprises a low-load energy absorbing strap 40 and a high-load energy absorbing strap 42. A coupling device comprising a pyrotechnic (pyro) device 50 connected to pyrotechnic device pin 52 and a pyrotechnic device attachment fastener 54 (as shown, a screw 56) is interposed between upper jacket 28 and straps 40, 42. Assembly 20 also includes a strap retainer 60, a strap retainer fastener 62 (shown as a retainer screw 64), and a strap position lock device 68. It will be appreciated that locking of this strap could be accomplished by alternate means other than strap position lock device 68.

Straps 40 and 42 are attached to upper jacket 28 by means of strap retainer 60 and fastener 62. As shown in FIG. 2, straps 40 and 42 extend longitudinally and generally parallel to longitudinal axis 24, in opposing directions, from strap retainer 60. At each of low load strap bend 72 and a high load strap bend 74, straps 40 and 42 respectively loop back around at about 180° and longitudinally converge at pyrotechnic device 50 at ends 82 and 84. Pyrotechnic device 50 is attached to strap 40 by fastener 54, and strap 42 is held in place at pyrotechnic device 50 by pyrotechnic device pin 52.

Figure 3:
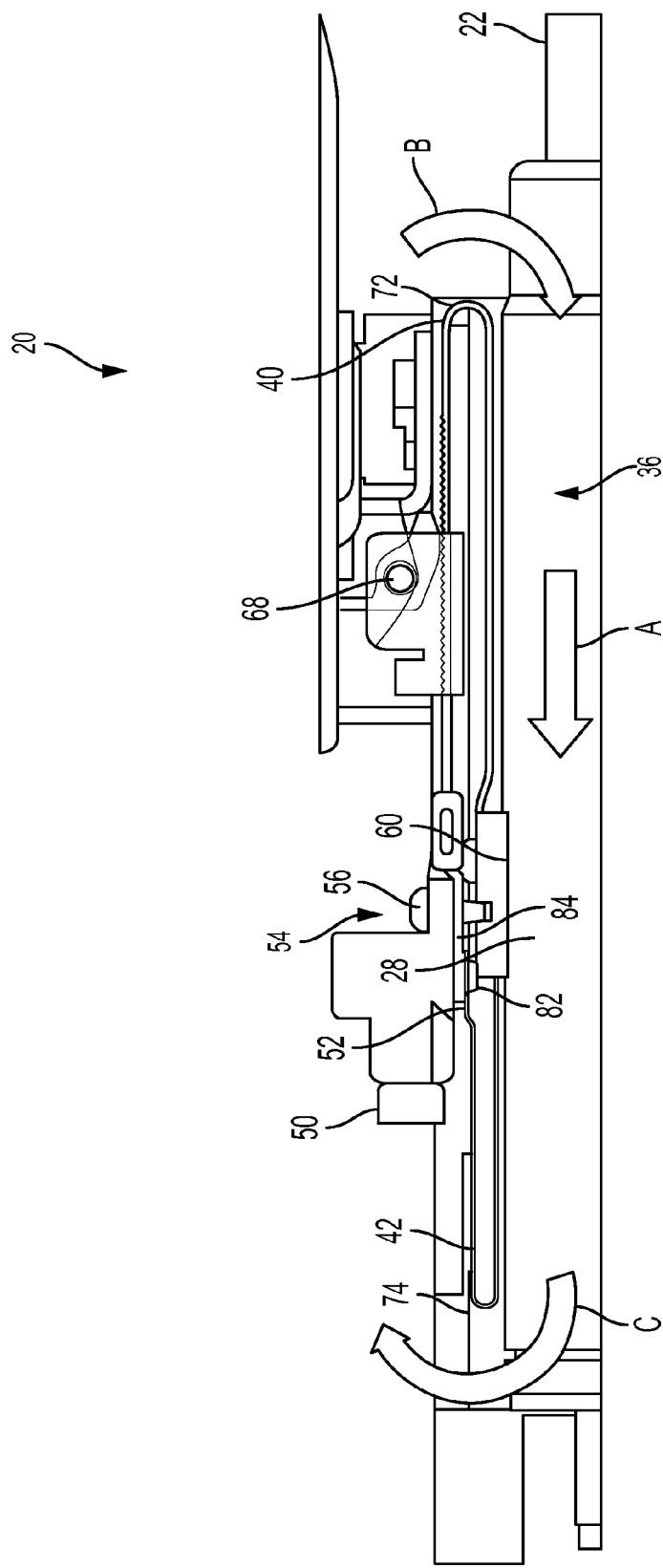
FIG. 3 is a bottom view of the steering system shown in FIG. 2 during a first impact event.

FIG. 3 illustrates steering column assembly 20 during a high-load crash or impact event that exceeds a threshold force (a high-load impact event). During a high-load event, pyrotechnic device 50 does not fire pyrotechnic pin 52 and keeps high-load strap 42 coupled to low-load strap 40 at pyrotechnic device 50. During the high-load impact event, upper jacket 28 will translate in the collapse direction of arrow A. This collapse causes strap retainer 60 to move, in the collapse direction of arrow A, parallel to longitudinal axis 24. The attached ends 82 and 84 of low-load strap 40 and high-load strap 42, respectively, are retained at pyrotechnic device 50 by pyrotechnic pin 52. Straps 40 and 42 would just freely translate except they are held by strap position lock device 68. This locking causes strap bend 72 to maintain shape and roll in the direction of arrow B and strap bend 74 of strap 42 to unroll in the direction of arrow C. The combined rolling of straps 40 and 42 creates a large resistive force that requires a higher load impact at steering wheel end 32 to collapse upper jacket 28 in the collapse direction A.

Figure 4:
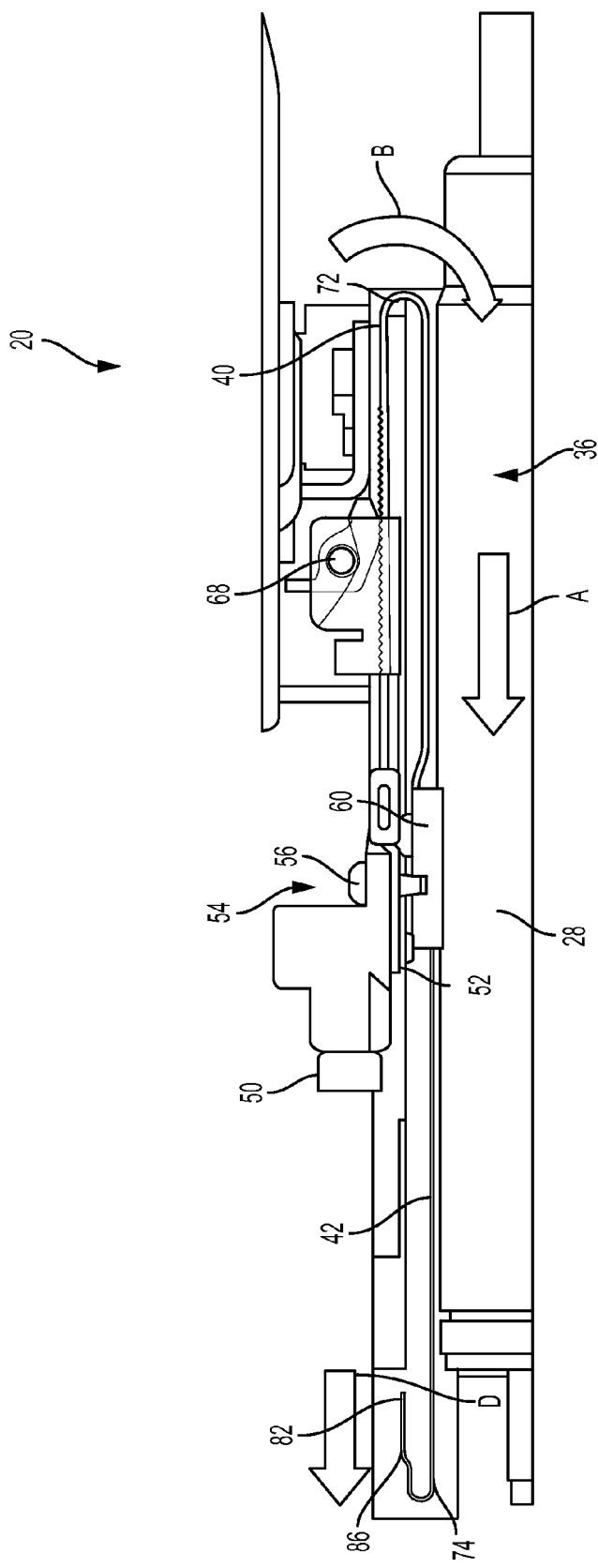
FIG. 4 is a bottom view of the steering system shown in FIG. 2 during a second impact event.

FIG. 4 illustrates steering column assembly 20 during a low-load crash or impact event that falls below the above defined threshold force high-load impact event (hereinafter a low-load event). During a low-load event, pyrotechnic device 50 fires causing pyrotechnic pin 52 to retract from a hole 86 which extends through strap 42. Once pyrotechnic pin 52 is retracted, strap 42 is no longer coupled to strap 40 and no longer locked or restrained by strap position lock 68. As in the high-load event described in FIG. 3, the low-load strap 40 reacts in the same manner. However, high-load strap 42 is no longer locked by pyrotechnic pin 52 and strap position lock 68. As such, end 82 is allowed to freely translate without building load. Therefore, strap bend 74 does not roll and freely translates with the rest of strap 42 and upper jacket 28 in the direction of arrow D.

As described herein, two roll straps 40, 42 are attached to a collapsing jacket (upper jacket 28), one strap 40 being pulled and the other strap 42 being pushed and placed in compression, to create two different loads. The two straps 40, 42 are coupled (e.g., screwed) to the collapsing upper jacket 28, run out in opposing directions and loop back around and come back together and are attached to each other by a pyrotechnic device 50. If the pyrotechnic device 50 is unfired, the two straps, 40, 42 unroll together and the combined loads become the collapse load. If the pyrotechnic device 50 is fired, a pin 52 is retracted and only one strap 40 will roll, thus reducing the collapse load. It will be appreciated that each strap 40, 42 may be capable of bearing the same load or end strap may vary from the other in dimension or thickness to have a different load profile.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An energy absorbing device for a steering column assembly, the device comprising:
    a first strap coupled to the steering column assembly, the first strap configured to absorb energy of an impact event on the steering column assembly;
    a second strap coupled to the steering column assembly, the second strap configured to absorb energy of an impact event on the steering column; and
    a coupling device attaching the second strap to the first strap such that both the first strap and the second strap absorb energy of a first impact event, and the device is configured to selectively uncouple the second strap from the first strap in advance of a second impact event wherein during the first impact event the first strap is configured to be placed in tension by the coupling device and the second strap is configured to be placed in compression by the coupling device.

2. The energy absorbing device of claim 1, wherein the coupling device retains an end of the first strap to an end of the second strap.

3. An energy absorbing device for a steering column assembly, the device comprising:
    a first strap coupled to the steering column assembly, the first strap configured to absorb energy of an impact event on the steering column assembly;
    a second strap coupled to the steering column assembly, the second strap configured to absorb energy of an impact event on the steering column; and
    a coupling device attaching the second strap to the first strap such that both the first strap and the second strap absorb energy of a first impact event, and the device is configured to selectively uncouple the second strap from the first strap in advance of a second impact event wherein the first strap and the second strap are co-linear with the coupling device so the first strap, the second strap, and the coupling device are configured to move together during the first impact event.

4. The energy absorbing device of claim 3, wherein during the first impact event the first strap is configured to be placed in tension by the coupling device and the second strap is configured to be placed in compression by the coupling device.

5. A steering column assembly comprising:
    a mounting bracket;
    a first jacket coupled to the mounting bracket and having a first longitudinal axis;
    a second jacket slidably disposed with the first jacket for telescoping movement along the longitudinal axis relative to the first jacket; and
    an energy absorbing device operatively associated with the second jacket, the energy absorbing device comprising:
    a first strap coupled to the second jacket, the first strap configured to absorb energy of an impact event on the steering column assembly;
    a second strap coupled to the second jacket, the second strap configured to absorb energy of an impact event on the steering column; and
    a coupling device attaching the second strap to the first strap such that both the first strap and the second strap absorb energy of a first impact event, and the coupling device is configured to selectively uncouple the second strap from the first strap prior to a second impact event, and the first strap and the second strap are generally co-linear with the coupling device.

6. The energy absorbing device of claim 5, wherein during the first impact event the first strap is configured to be placed in tension by the coupling device and the second strap is configured to be placed in compression by the coupling device.

7. The energy absorbing device of claim 5, wherein the coupling device retains an end of the first strap to an end of the second strap.

* * * * *